Sept. 28, 1954     H. C. UREY ET AL     2,690,379
PROCESS FOR PRODUCTION OF DEUTERIUM OXIDE
AS A SOURCE OF DEUTERIUM
Filed Nov. 21, 1942                                        10 Sheets-Sheet 2

INVENTORS
Harold C. Urey
Aristid V. Grosse
BY

Sept. 28, 1954  H. C. UREY ET AL  2,690,379
PROCESS FOR PRODUCTION OF DEUTERIUM OXIDE
AS A SOURCE OF DEUTERIUM
Filed Nov. 21, 1942  10 Sheets-Sheet 8

Inventors
Harold C. Urey
Aristid V. Grosse

By Robert A. ~~~~~~~~

Attorney

Inventors
Harold C. Urey
Aristid V. Grosse

Patented Sept. 28, 1954

2,690,379

UNITED STATES PATENT OFFICE 2,690,379

PROCESS FOR PRODUCTION OF DEUTERIUM OXIDE AS A SOURCE OF DEUTERIUM

Harold C. Urey, Leonia, N. J., and Aristid V. Grosse, Bronxville, N. Y., assignors to the United States of America as represented by the United States Atomic Energy Commission Application November 21, 1942, Serial No. 466,498

14 Claims. (Cl. 23—204)

This invention relates to the production of water having a high percentage of heavy water of deuterium oxide, $D_2O$, as a source of deuterium for various compounds of this isotope.

The object of our invention is to provide an effective system for the substantial increase of the natural deuterium content of water, which is about 1 part $D_2O$ in 7000 $H_2'O$. Shortly after the discovery of the heavy isotope of hydrogen, Urey and Greiff (J. Amer. Chem. Soc. 57, 321 (1935)) pointed out the general possibility of separating isotopes by means of exchange reactions of the type:

$$I_LX + I_HY \rightleftarrows I_HX + I_LY$$

where $I_L$ and $I_H$ stand for a light and heavy isotope of any element and X and Y for any other chemical atom or group.

The separation is due to the fact that the equilibrium constant K of these reactions, in other words, the ratio of the concentration of the reactants, or mathematically, $$K = \frac{(I_HX).(I_LY)}{(I_LX).(I_HY)}$$

is not equal to exactly unity, and, therefore, some enrichment does take place in either one or the other of the compounds (IX or IY). In view of the large difference in mass of the hydrogen isotopes, this divergence from classical statistical distribution reaches its peak in the case of deuterium.

If we take, for example, two typical hydrogen exchange reactions, namely, the exchange between the hydrogen molecule itself and water, or ammonia, according to the two Equations (a) and (b):

(a)

and (b)

K was found to have, both theoretically and experimentally, the values given in Table 1 at the specified temperatures. (The separation coefficient, $\alpha$, is also included in the table.)

TABLE 1.—EQUILIBRIUM CONSTANTS FOR—

(a) Water-hydrogen exchange

| Temperature, ° C. | Gaseous $H_2O$ $K = \alpha$ | Liquid $H_2O$ $K = \alpha$ |
|---|---|---|
| 0° | 4.19 | 4.59 |
| 25° | 3.62 | 3.92 |
| 50° | 3.20 | 3.37 |
| 75° | 2.88 | 3.02 |
| 100° | 2.63 | 2.70 |
| 125° | 2.43 | |

(b) Ammonia-hydrogen exchange

| Temperature, ° C. | Gaseous $NH_3$ | | Liquid $NH_3$ | |
| | K | $\alpha$ | K | $\alpha$ |
|---|---|---|---|---|
| 0° | 6.85 | 4.37 | 7.01 | 4.67 |
| 25° | 5.83 | 3.89 | 5.90 | 3.93 |
| 100° | 4.10 | 2.73 | 2.73 | 2.70 |

For purposes of practical enrichment and concentration of deuterium, the above reactions proceed at too slow a rate. We have found, after completing a number of experimental tests, that hydrogen exchange reactions useful for the purpose of enriching deuterium can be speeded up to practically useful rates by means of catalysts described in this application.

Illustrating the process and apparatus involved and the results attained, are the accompanying drawings in which.

Before discussing the chemical and other properties of our catalysts and their methods of preparation, it may be appropriate to describe generally the technical process of separation.

In its simplest terms, the process is based on equilibrating, that is, bringing closer to equilibrium, the mixture of two separable hydrogen-containing molecules, or specifically, hydrogen and water by means of catalysts described below.

In order to obtain large quantities of concentrated deuterium from either water of normal abundance (1 part of D in 6,900 parts of H') or from slightly concentrated deuterium water, a much larger fractionation factor than a single process factor, or single establishment of equilibrium, is necessary. This can be readily accomplished by using fractionation equipment similar to those employed in the industry for fractionation, extraction and absorption processes, or what will be called "catalytic tower" in the following paragraphs.

The fundamental principle of a "catalytic exchange tower" or column is based on the following:

In every volume element of the tower filled with catalyst, the mixture of water and hydrogen tends to equilibrate (i. e., reach equilibrium in the deuterium distribution). The D enriches in the water, in accord with the value of K (see Table 1), and this enriched water is passed into an adjoining part of the column where it meets hydrogen richer in D than the hydrogen in that part in which it had just equilibrated and where it can therefore be still further enriched in deuterium. The reverse is true for hydrogen; this is passed to parts of the column containing water poorer in D than the parts in which it had equilibrated.

A number of general schemes are practicable for purposes of such enrichment and will now be described in greater detail. For simplicity we will confine ourselves to schemes involving, outside of a catalyst, only water and hydrogen. Obviously systems involving other compounds, for instance, ammonia, or both, are possible.

Five schemes are discussed in the following paragraphs, each scheme, except No. 4, is illustrated by a flow chart:

*Scheme 1.—Description of counter-current exchange tower (see Fig. 1)*.—Liquid water enters at the top 20 of the catalytic tower 21 and flows down by gravity to the foot 22 of the tower from which it is removed. It then passes into a reaction vessel 23 where it is transformed into hydrogen. This reaction vessel may be an electrolytic cell or it may be a water gas-coke chamber or a catalytic chamber for the reaction of methane with water to give carbon dioxide and hydrogen, or any other scheme whereby water may be transformed into hydrogen. The hydrogen resulting from this reaction enters the foot 24 of the tower 21 either at atmospheric pressure, high pressure or low pressure and passes upward counter-current to the stream of water. The hydrogen is removed at the top 25 of the tower. A certain quantity of water is removed continually or as desired from the reaction vessel, for instance as indicated at 26, and is the product of the tower.

Figure 1:
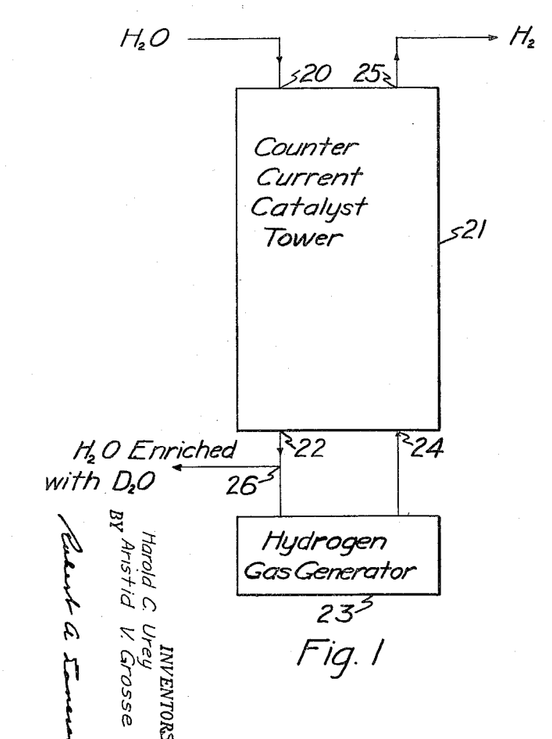
Figs. 1, 2, 3 and 4 are diagrams illustrating schematically various catalytic treatments.

This is essentially a device for counter-current scrubbing of water and hydrogen. The body of the tower is filled with an appropriate catalyst and by its action deuterium is transferred from the gaseous phase to the liquid phase. The liquid water from the reaction vessel is enriched in deuterium an amount depending on the activity of the catalyst, the length of the tower, and the rate of production.

*Scheme 2.—A con-current exchange unit (see Fig. 2)*.—A mixture 30, 31 of water and hydrogen or of water vapor and hydrogen is passed through a bed of catalyst in catalyst tower 32. If liquid water is employed the two streams are separated at the exit as indicated at 33, 34 and are immediately available for use in another unit or in another plant. If water vapor is used the water vapor must be stripped out of the hydrogen gas in another apparatus. During the period of con-current flow over the catalyst deuterium is transferred from the hydrogen to the water or water vapor. The pressures and the temperatures inside the con-current unit are variable.

Figure 3:
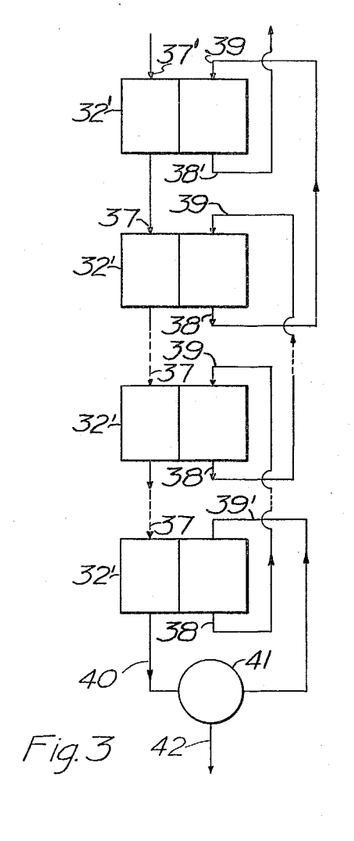

*Scheme 3.—A cascade of con-current units.*—
(a) *A con-current unit using liquid water (see Fig. 3)*.—A cascade consists of a number of identical con-current units 32' of the type described in scheme 2. The units are connected up in series in such a way that the water entering each unit at 37 comes from the exit side of the preceding unit, while the water leaving the unit is fed into the next unit of the series. The hydrogen entering each unit, on the other hand, comes from the exit of the succeeding unit, and the hydrogen leaving each unit at 38 is fed into the entrance 39 of the preceding unit. The first unit of the series is fed at 37' with water which it is desired to process. The hydrogen leaving the first unit at 38' is discarded or used as desired. The water from the last unit of the series at 40 is converted to hydrogen in a reaction vessel 41 of the sort described under scheme 1 and the hydrogen thus created is the hydrogen feed of the last unit at 39'. A certain amount of water is continuously (or discontinuously) withdrawn from the reaction vessel as at 42 and is the product of the cascade. The flow of water and hydrogen is thus counter-current in the cascade as a whole, although con-current in the individual units.

(b) *A con-current unit using water vapor.*— The cascade consists of a series of alternating con-current exchange units of the type described under scheme 2 (vapor phase) and so-called strippers. There is one more stripper than exchange units, so that every exchange unit is flanked by a stripper on the entrance and exit side. The strippers are, for example, bubble-cap plate towers in which water vapor and hydrogen are passed counter-current to a stream of water. The water fed into the stripper comes from the exit of the preceding stripper and its own exit water is fed into the next succeeding stripper. The mixed hydrogen and water vapor passes alternately through the catalyst beds and the strippers. Water to be processed passes into the first stripper and then into succeeding strippers. The water from the last stripper is converted to hydrogen by any of the means indicated in scheme 1. The resulting hydrogen is passed into the last stripper where it is saturated with water vapor, then into the last exchange unit, then into the next to the last stripper, then into the next to the last exchange unit, and so on. The hydrogen and water vapor mixture leaving the first stripper is discarded. A certain amount of water is withdrawn from the foot of the last stripper and is the production of the cascade.

*Scheme 4.—More general cascades*.—The units in a cascade do not necessarily have to be attached to their nearest neighbors. Depending on the relative proportions of water or water vapor and hydrogen, it may be expedient, for example, to connect the hydrogen exit to the fourth preceding unit, while the water may continue to the immediately succeeding one. An infinite number of variants of this order are possible.

Figure 2:
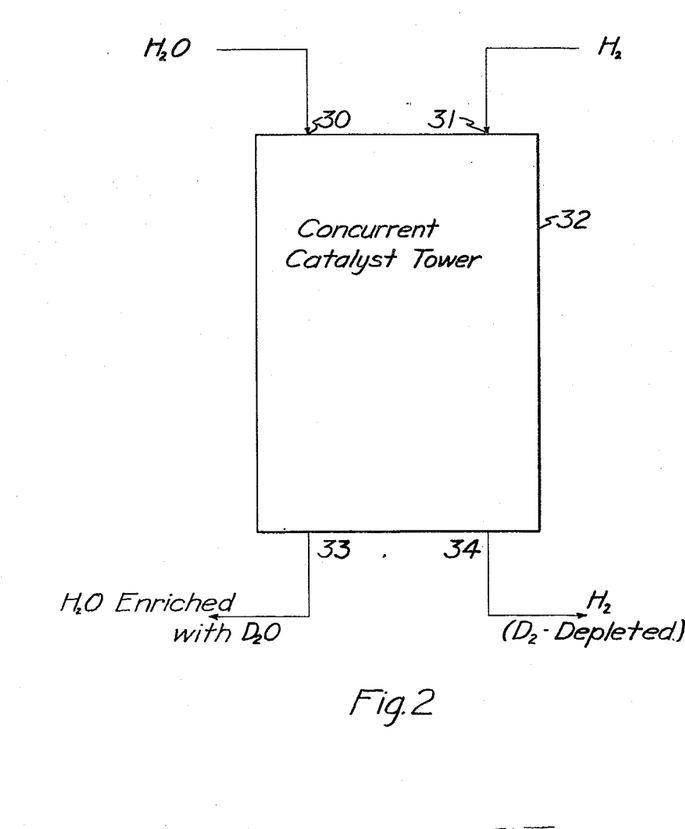
Figure 4:
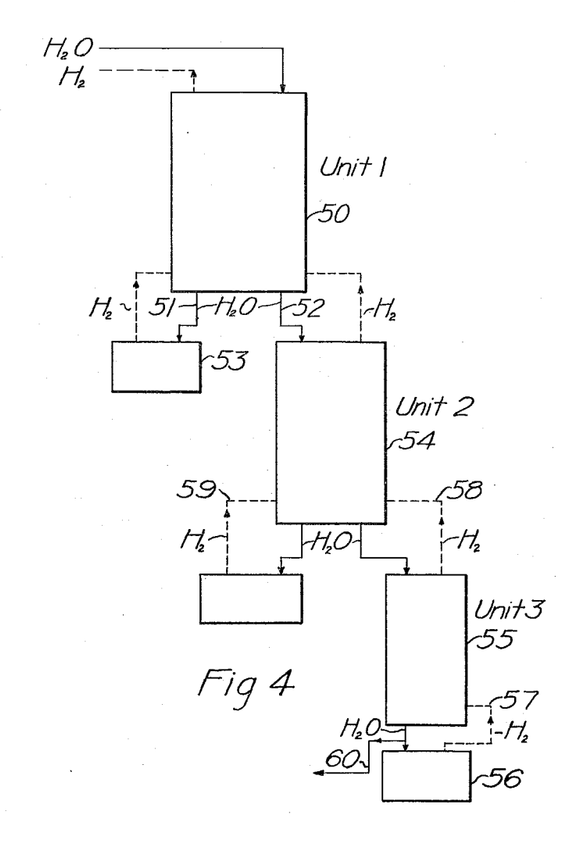

*Scheme 5.—Cascades of counter-current units, or cascades of con-current units (see Fig. 4)*.— Each of the four preceding systems except in Fig. 2 can be considered schematically as a system in which at one end water enters and hydrogen leaves (we will call this the top end), while at the other (the bottom) end water leaves and hydrogen enters. The water leaving the bottom end is enriched in deuterium. The hydrogen leaving the top end is stripped of deuterium. A cascade of such systems consists of a number of such systems graded in size such that the first is bigger than the second, and so on, as illustrated in Fig. 4. Water leaving the first cascade 50 at 51 and 52 is partially converted to hydrogen as in chamber 53 for water from discharge 51. The unconverted water from discharge 52 is then fed into the second system 54 and so on for systems 55, etc. At the end of the last system, 55 for instance, all the remaining water, except that which is reserved as the production of the cascade and withdrawn through line 60, is converted into hydrogen in chamber 56 and fed back into the last system at 57. The hydrogen leaving the top of the last system 55 at 58, is admixed with the hydrogen 59 from the converted water of the next to the last system 54 in the bottom of the next to the last system 54, and so on. In this way if we follow the flow of water from the first cascade to the last, we see that it continually decreases in size. Following the flow of hydrogen from the last system to the first, we see that it increases in size as it accumulates hydrogen being produced from water between successive systems. In this way any desired gradation in size of the successive systems may be accomplished. Notice in particular that a system may consist of only one con-current exchange unit. A cascade of con-current units considered under scheme 3 is thus a special case of this cascade.

*Practical performance of plant.*—The performance of various plants can be readily calculated if the activity of the catalyst is known.

The differential equations describing the exchange of two constituents between gas and liquid according to the first equation hereinbefore set forth are as follows:

$$H\frac{\partial N}{\partial t}+L\frac{\partial N}{\partial Z}=-K[N(1-n)-\alpha n(1-N)]$$

$$h\frac{\partial n}{\partial t}+l\frac{\partial n}{\partial Z}=K[N(1-n)-\alpha n(1-N)]$$

where:

$H$=hold-up of liquid per unit length of tower
$h$=hold-up of gas per unit length of tower
$L$=liquid flow per unit time
$l$=gas flow per unit time
$N$=mole fraction of $D_2O$ in liquid
$n$=mole fraction of $D_2$ in gas
$k$=activity constant of the catalyst
$\alpha$=equilibrium constant at the temperature of operation or separation coefficient.

For counter-current flow $L$ and $l$ have opposite signs, and con-current flow they have the same sign.

For the steady state, these equations can be readily integrated. The theory for the various schemes mentioned may be developed, but is too involved to require discussion here. A discussion of this may be found in Urey, Reports on Progress of Physics VI, 48–77 (1939). Only a final practical result need be cited.

*Example of performance of scheme 3(a).*—A nickel catalyst of the type hereinafter described will convert a hydrogen water mixture to half its equilibrium value in 5 minutes at 25° C. and 300 atmospheres' hydrogen pressure.

Permitting 50 and 75% conversion to equilibrium respectively in each stage, the following number of units and volume of catalyst, operating at 300 atmospheres and 25° C., will be required to increase the natural concentration of deuterium in water by a factor of 30 and for a production of one ton of $D_2O$ per month, in the form of a 0.42% solution.

TABLE 2

| Percent Equilibrium attained per stage | Number of Stages | Volume of Ni Catalyst per stage, cu. ft. | Total volume of catalyst, cu. ft. |
|---|---|---|---|
| 50% | 13.5 | 130 | 1,760 |
| 75% | 7.25 | 263 | 1,910 |

Starting with ordinary water containing $D_2O$ in the ratio of 1:6900, or .014%, the above scheme will raise it to a ratio of 1:230 or to 0.42%.

For the one ton $D_2O$ per month production, in the concentration just given, 300 tons of ordinary water per day will have to go through the plant.

Since the monthly water throughput contains 1.30 tons of $D_2O$, the recovery of $D_2O$ by the above scheme is about 75% of the original content.

The final concentration to the 100% $D_2O$ stage can be done by either repeating the above scheme or also by fractional distillation or the well known electrolytic method of deuterium concentration described by Washburn and Urey.

*Catalysts*

As mentioned previously exchange reactions involving molecular hydrogen are very slow and have to be promoted by catalysts. However, even catalytic promotion is not enough for practical purposes unless the catalysts are very efficient.

We have found that very efficient catalysts for our purpose can be prepared by distributing the following metals, or their compounds, on suitable supports. These metals are: Nickel, cobalt, iron, ruthenium, rhodium, palladium, osmium, iridium, platinum, molybdenum, tungsten and rhenium. Particularly significant are (*a*) platinum, (*b*) nickel and (*c*) molybdenum and tungsten catalysts.

(*a*) *Effect of various metals on performance of catalyst.*—We will now proceed to describe the performance of some of our typical catalysts.

The activity of our catalysts can best be measured by determining the rate at which the distribution of deuterium in a hydrogen water mixture changes with time.

Like all exchange reactions, ours follows a monomolecular law. It is expressed by the relation:

$$\ln\{(D/H)_\infty-(D/H)_t\}=kt$$

where $k$ is the rate constant, $(D/H)_t$ and $(D/H)_\infty$ the ratio of deuterium to protium (in the gas or liquid phase) at the time $t$ or at equilibrium, $\infty$, respectively.

It is usual to express the activity of catalysts in terms of half-times, T. This is namely the time necessary for the catalyst to convert the reacting mixture to half of its equilibrium composition. It is related to $k$ by the expression:

$$T=\frac{\ln 2}{k}=\frac{0.693}{k}$$

T (or $k$) have to be normalized to definite conditions.

We define the standard half-time, $T_{stand}$, as:

$$T_{stand} = \frac{T_{exper.} \cdot v \cdot f}{V}$$

where $v$=catalyst volume, $V$=volume of reacting gas (in same units as $v$) and $f$=percent free space or voids on the catalyst, and $T_{exper.}$ is the time of the experimental run.

Since $f$, the free space factor, varies first with various catalysts and second with various water contents, it is more practical to use the concept of space velocity, familiar in industrial chemistry.

Space velocity, or S. V., is defined as the volume of gas (or liquid) at 0° C. and 760 mm. Hg (unless otherwise indicated) passed over 1 volume of catalyst space per unit time (usually hour). For example, an hourly space velocity of 5000 means 5000 vol. of gas at N. T. P. were passed over 1 bulk vol. of catalyst per hour.

We will define further as half conversion space velocity, or for short, H. C. S. V., as the S. V. required to obtain half conversion to equilibrium. For example, the statement "catalyst Q has an hourly H. C. S. V. of 5000 at 200 atm. pressure and 100° C." means that catalyst Q, operating at 200 atm. and 100° C. will convert to half the equilibrium value every hour 5000 vol. of gas (measured at 0° and 760 mm.) for every 1 volume of catalyst space. Space velocity per hour (at N. T. P.) is related to the contact time C in minutes at the temp. T° abs. and a pressure of P atm. by means of the following equation:

$$S.\ V._{per\ hour} = \frac{V_{N.\ T.\ P.}/per\ hour}{V} = \frac{60 f \cdot P}{C} \cdot \frac{(273°)}{T°}$$

For H. C. S. V.$_{per\ hour}$ we, of course, substitute C by $T_{stand}$ minutes.

The experimental proof of monomolecular kinetics for our own catalysts follows from the straight line relationship between $\log_e$ $$\log_e\{(D/H)_\infty - (D/H)_t\}$$

and $t$ as a perusal of Figs. 5, 6, 7 and 8, inclusive, will indicate.

The concentration of deuterium in a mixture with hydrogen gas can be simply and rapidly evaluated by means of a mass spectrograph.

The concentration of deuterium in water can be determined by either converting this water into hydrogen gas and then analyzing it as just mentioned or by means of density determination of the water or by means of an interferometer.

Figure 5:
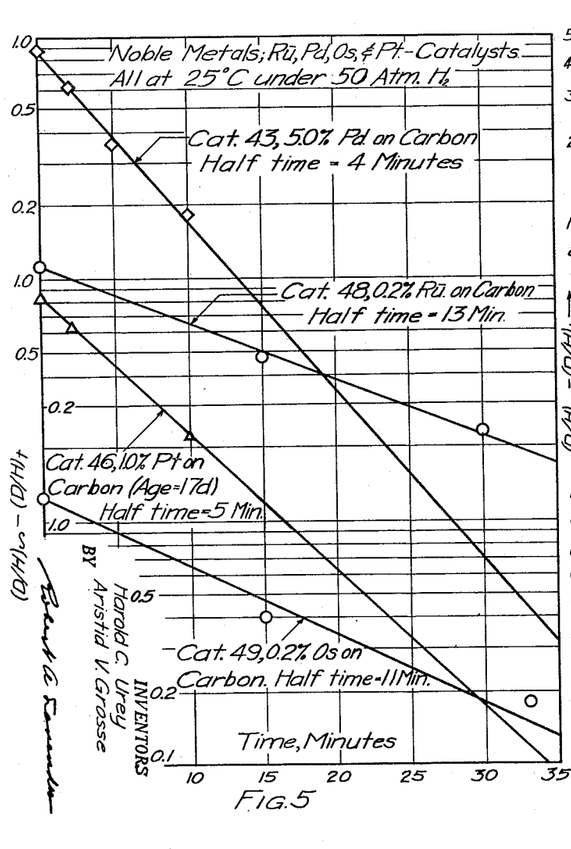
Figs. 5, 6, 7, 8, 9, 10, 11, 12, 13, 14 and 15 are curve sheets showing characteristics and performances of various catalysts.

The performance of some noble metal catalysts, containing 0.2 to 5% of the noble metal supported on activated carbon in the liquid water-hydrogen exchange, is illustrated in Fig. 5. The half-time is 4 minutes for the 5% palladium on carbon catalyst (catalyst No. 43) and 5 minutes for the 1% platinum on carbon catalyst (catalyst No. 46). Catalysts containing ruthenium and osmium are also shown. Catalysts with rhodium and iridium show similar activities.

Figure 6:
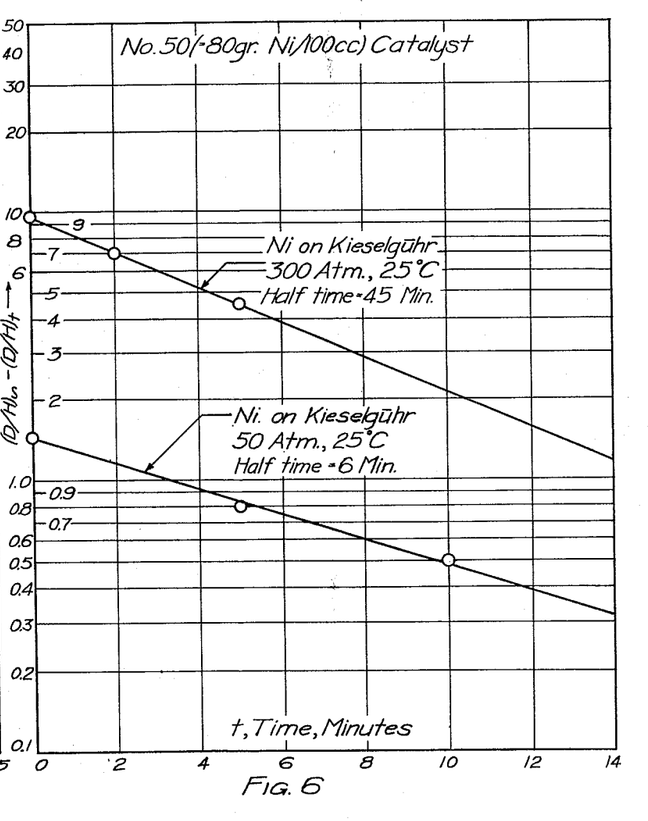
Figure 7:
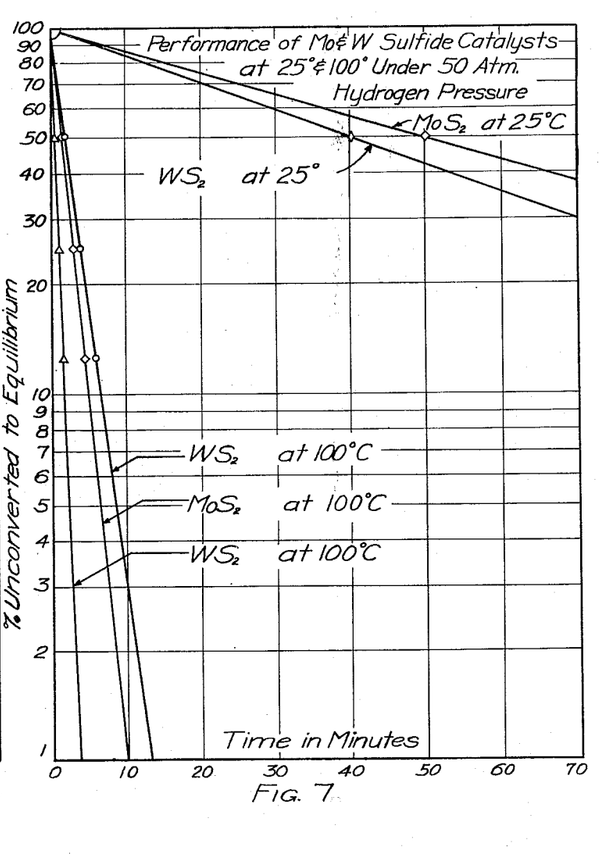

The efficiency of a nickel on kieselguhr catalyst is demonstrated in Fig. 6. The performance of molybdenum and tungsten sulphide catalysts at both 25 and 100° C. is illustrated in Fig. 7.

The performances of a cobalt and iron on kieselguhr catalyst and a 1% rhenium sulphide ($Re_2S_7$) on charcoal catalyst, all at 50 atm. hydrogen pressure and 25° C., are given in the following tabulation:

| Composition of catalyst | Half-times (m.=minutes, h.=hours) at various ages (d.=days) | | | |
|---|---|---|---|---|
| | Age 1 d. | Age 5 d. | Age 10 d. | Age 50 d. |
| 10 g. Ni/100 cc. kieselguhr.[1] | 100 m. | | 95 m. | |
| 10 g. Co/100 cc. kieselguhr. | 33 h. | 33 h. | | |
| 10 g. Fe/100 cc. kieselguhr. | 145 h. | 145 h. | 145 h. | |
| 1 g. $Re_2S_7$/100 cc. charcoal. | 20 m. | | 16 m. (17 d.) | 19 m. |

[1] All three kieselguhr catalysts were prepared by impregnating kieselguhr with a solution of the corresponding metal nitrate and precipitating at room temperature with a slight excess of $Na_2CO_3$ solution, washing with distilled water and reducing with hydrogen at 350 to 450° C.

Figure 8:
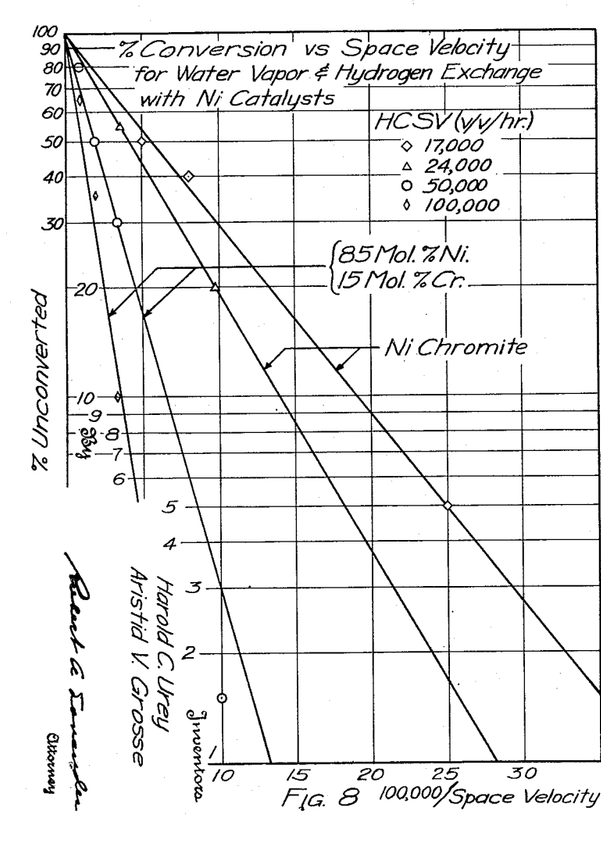

All the above performances pertain to exchange with liquid water. Water vapor exchanges much more rapidly and the performance of various Ni-Cr catalysts is illustrated in Fig. 8; here the half-times range between 0.2 to 0.03 seconds.

Figure 9:
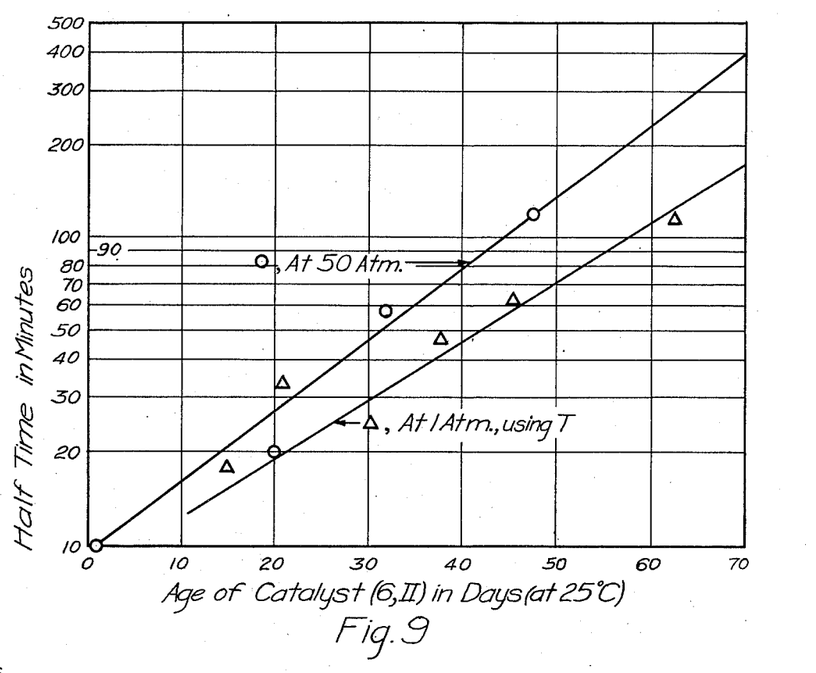
Figure 10:
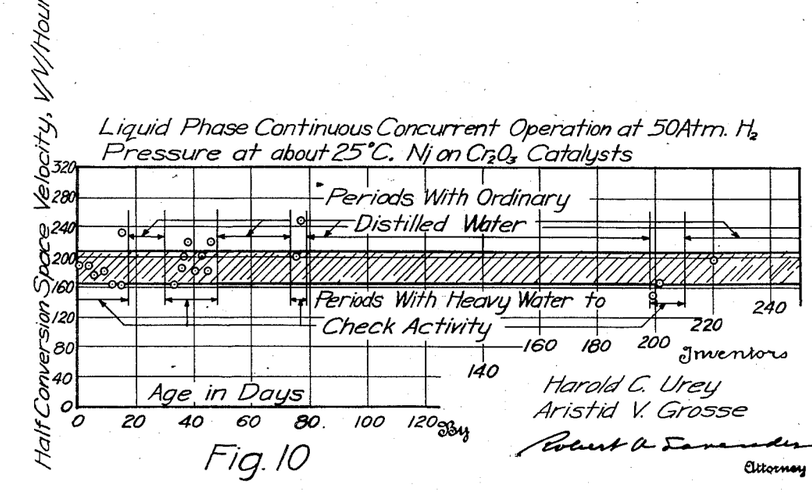

(b) *Effect of time or aging on performance.*—In the figures demonstrated only the initial performance of our catalysts was shown. In ordinary catalytic reactions the activity of a catalyst does usually change with time due to change of surface area or chemical properties of the surface. These changes may be due to slow reactions taking place in the solid phase or to slow crystallization or shrinking or again to dehydration or hydration of the supporting material. The usual situation of an aging catalyst, No. 6, II platinum on silica, is illustrated in Fig. 9. One immediately sees that the catalyst deteriorates rapidly and naturally such a behavior is not desirable from a practical standpoint. The catalysts finally developed show a steady performance over long periods of time. This is shown for a number of our catalysts in Figs. 10, 11 and 12. Fig. 10 demonstrates the performance of a nickel on chromia catalyst in exchanging deuterium and liquid water and hydrogen at 50 atmospheres' pressure and 25° C. over a period of 210 days of continuous operation.

Figure 11:
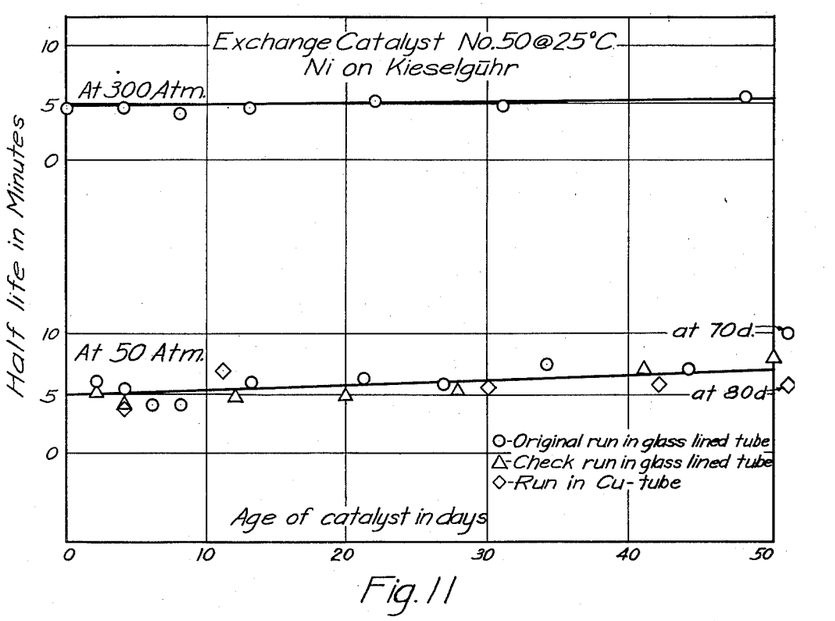

Fig. 11 records the performance of a nickel on kieselguhr catalyst at 25° C. and at both 50 and 300 atmospheres hydrogen pressure over a period of 50 days.

Figure 12:
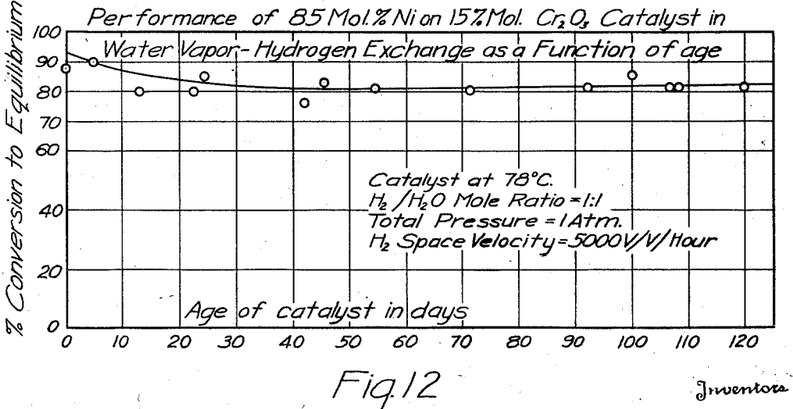
Figure 13:
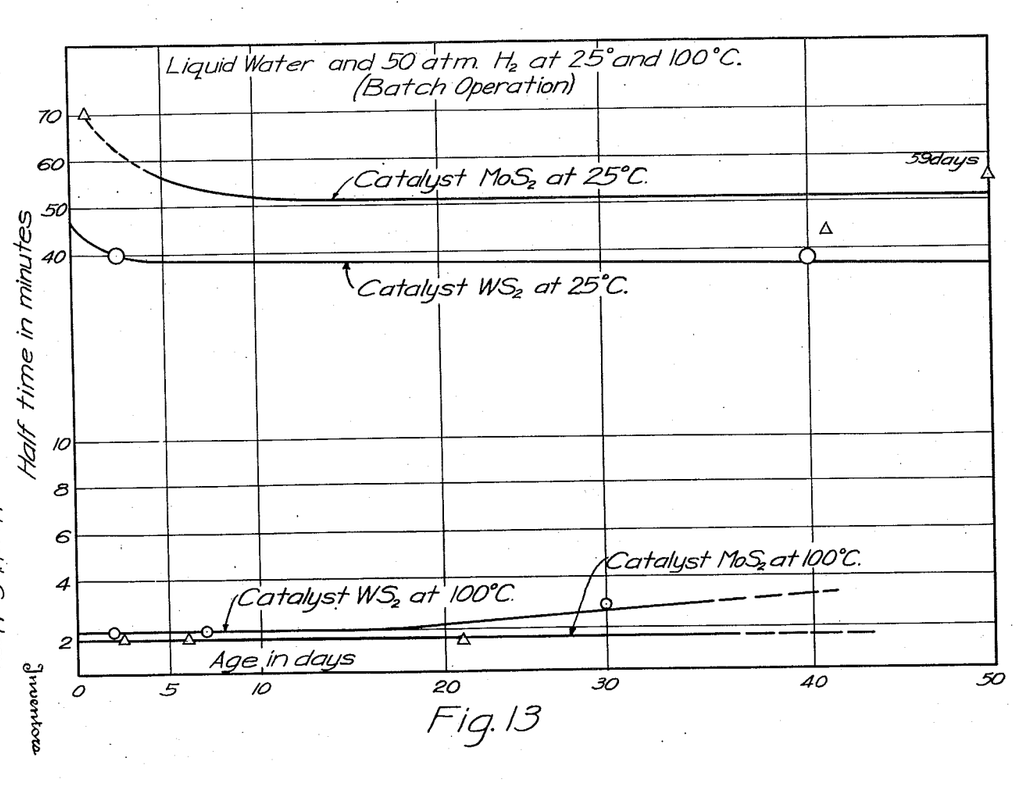

Fig. 12 shows the performance of a similar nickel on chromium oxide catalyst in the water vapor-hydrogen exchange at 1 atmosphere pressure and at 78° C. for a period of over 120 days. One sees that aside from slight fluctuations the activity of the catalyst is practically constant, which is of great value for the operation of a plant. In Fig. 13 the behavior of molybdenum and tungsten sulphide catalysts is shown; here again steady performance has been achieved.

Figure 14:
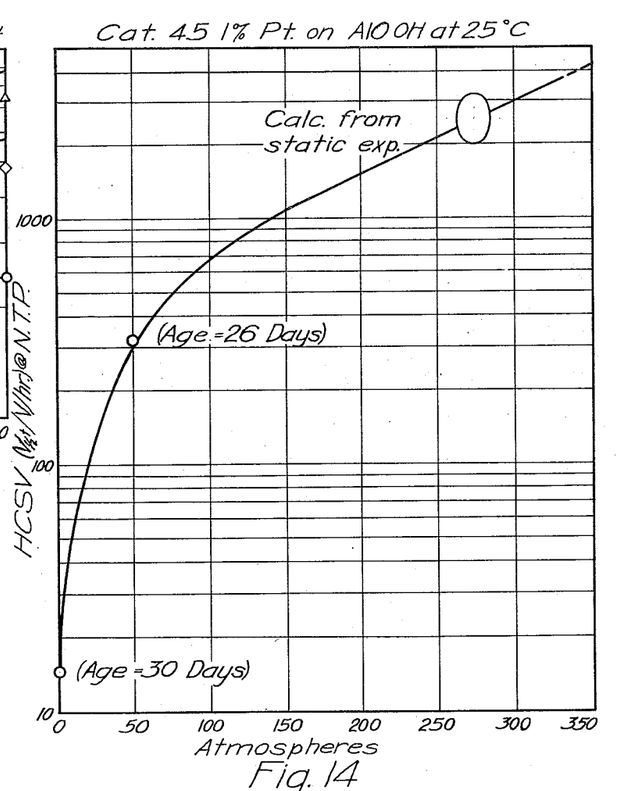

(c) *Effect of pressure in liquid water exchange.*—We have found that in any liquid water hydrogen exchange the half-time of the exchange reaction is practically independent of pressure, as shown in Fig. 11, mentioned above. On the other hand the half conversion space velocity does increase approximately proportional to the pressure. This is illustrated in Fig. 14, which shows the results obtained with one and the same catalyst at 1, 50 and 275 atmospheres of hydrogen pressure.

For a given volume of catalyst it is therefore evident that it is advantageous to use pressure. For industrial operation one will therefore choose the highest possible pressure compatible with the cost of the high pressure equipment.

(d) *Effect of temperature in liquid and vapor exchange.*—In all cases temperature increases the activity of our catalysts.

The rising activity is in some cases very regular, whereas the others, for instance in the case of tungsten and molybdenum sulphides, the increase in activity is very large and unexpected. To be more specific, the activity is very low at room temperature, the half-time being of the order of ¾ to 1 hour and then suddenly decreases at 100° C. to half-times of the order of a few minutes to even less than a minute, as shown in Fig. 13. The normal effect on liquid water and hydrogen exchange is demonstrated in Table 3.

TABLE 3.—EFFECT OF TEMPERATURE ON HALF-TIME

['= minute.]

| Catalyst No. | Composition | Half-time at— | |
|---|---|---|---|
| | | 25° | 100° |
| Cat. 42 | Platinum on carbon, at = 500 atm. | 15' | 4' |
| Cat. 1 IV | Platinum on silica, at 50 atm | 20' | 6' |
| Cat. 50 | Nickel on kieselguhr, at 50 atm | 5–7' | 2' |
| Cat. 50A | Nickel with 16 Vol. Percent H₂O at 50 atm | 6.5' | 1.5' at 75° |
| Cat. 50A | Nickel with 38 Vol. Percent H₂O at 50 atm | 9.5' | 1.5' |

In the last case for instance the energy of activation equals about 900 cal./mole and in all cases mentioned in Table 3 corresponds to the normally expected amount.

A very similar situation exists in the vapor exchange. The effect of temperature is shown in Table 4 in the gaseous ammonia and hydrogen exchange:

TABLE 4.—H. C. S. V. AT VARIOUS TEMPERATURES

| Metal | Composition and No. of Catalyst | Run No. | Temperature, °C. | | |
|---|---|---|---|---|---|
| | | | 22° | 48° | 100° |
| | | | H. C. S. V., v./v./h. | | |
| Ni | 85% Ni on 15% Cr₂O₃ | 10a | 950 | 3,700 | |
| Pt | 5% Pt on charcoal | 6a | 1,500 | 10,000 | |
| Pt | 1% Pt on charcoal | I and III | 1,500 | | 15,000 to 20,000 |

An increase in reaction temperature from 22° C. to 48° C. causes an approximately four-fold increase of activity in the case of the nickel catalyst, and about six-fold in the case of platinum. An increase from 22° C. to 100° C. results in a more than ten-fold increase for the 1% Pt-catalyst.

In some cases big unusual increases in catalytic activity on raising temperature can be traced directly to chemical change in the "catalyst" itself.

For instance pure nickel oxide (NiO) does not catalyze the exchange of deuterium between hydrogen and water at room temperature. At least all experimental observations indicate that the half-time is greater than a few thousand hours. On raising the temperature to 100° C. "nickel oxide" becomes more and more active until after a few days it shows a half-time of about 20 to 25 minutes. In this case this enormous increase in activity is due to the gradual reduction of the nickel oxide to metallic nickel which seems to be the catalytically active substance.

(e) *Effect of metal concentration.*—The activity of various individual catalysts containing a single metal depends on the concentration of the metal, the nature of the support and the method of preparation. On the whole, the larger the metal concentration, the higher the catalytic activity, provided the structure of the metal or the nature of the support is such as to stabilize the higher dispersed metal initially produced and to prevent its crystallization or agglomeration to less active groups or clusters. The effect of concentration of a noble metal may be gathered from data given in Table 5.

TABLE 5.—EFFECT OF CONCENTRATION

| Catalyst No. | Composition* | Half-time of catalyst at 50 atm. H₂ and 25° C.; liquid H₂O |
|---|---|---|
| 1, II | 0.1% Pt on Alumina | 20–25'. |
| 45 | 1.0% Pt on Alumina | 7'. |
| 41 | 5.0% Pt on Alumina | 1–3'. |
| 27 | 0.05% Pt on Alumina (NN)** | 35–200' (16 d.). |
| 23 | 0.20 Pt on Alumina (NN) | 10→28' (5 d.) →37' (20 d.). |
| 28 | 0.05% Pd on Alumina (NN) | 170'. |
| 25 | 0.10 Pd on Alumina (NN) | 34'. |
| 34 | 0.10 Pd on Alumina (H.COONa) | cold 34' →70' (11 d.). |
| 35 | 0.20 Pd on Alumina (H.COONa) | 10' →30' (10 d.). |
| 44 | 5.0 Pd on Alumina (H.COONa) | 2' →4' (26 d.). |

* x% always means x gr. metal per 100 cc. of catalyst.
**(N. B. NN means prepared by reduction with hydrazine hydrochloride.)

In all cases the activity increases with the metal concentration, although it is far from being directly proportional to it, particularly in the higher concentration range. This is, of course, due to the well known fact that at these higher concentrations it is very difficult, if not impossible, to prevent the formation of larger crystals or larger agglomerates of the active metal. This lack of proportionality is of lesser practical significance with cheap metals like nickel but becomes of primary importance with the expensive noble metals.

(f) *Effects of supports.*—Various materials were used as supports for our catalytically active metals or other compounds. As is well known, it is possible by means of supports to obtain a much larger active surface for a given weight of metal or its compound. The support must have chemical properties which will not adversely affect the catalytic reaction. It should stabilize the active materials embodied in it and it should also be relatively low-priced. We have found various activated carbons and chars, and also activated alumina, to be particularly suitable for platinum and other noble metals. At the same time kieselguhr, and particularly chromium oxide, was found highly suitable for the support of the nickel catalysts.

(g) *Effect of poisons on performance of catalysts.*—As one would expect various substances act as poisons to our catalysts. They vary naturally with the composition of the catalyst.

The noble metal catalysts are very easily poisoned by hydrogen sulphide. The very minutest traces of hydrogen sulphide in the hydrogen gas or in the water will cause a rapid deterioration in their activity. Any trace of hydrogen sulphide has therefore to be eliminated in large scale operation.

Figure 15:
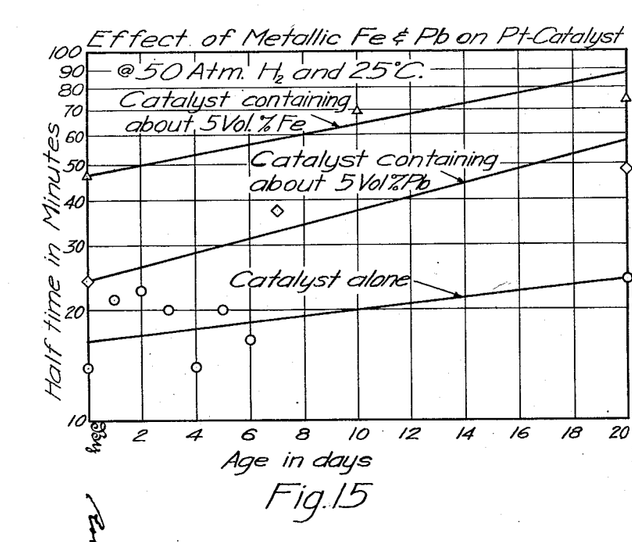

Various base metals, for instance lead and iron, in the form of filings mixed with our catalysts, cause a gradual diminishing in their activity. This effect is illustrated in Fig. 15.

Nickel catalysts are much less sensitive to poisons than platinum catalysts. For instance, some of our nickel catalysts contain amounts of sulphur of the order of .1 weight percent without causing harm to their performance. The molybdenum and tungsten catalysts exchange perfectly well in atmospheres of hydrogen sulphide, and in fact, need small amounts of hydrogen sulphide in the hydrogen gas mixture for maximum activity.

Carbon monoxide is a poison to our platinum catalyst and is also not desirable for a nickel catalyst.

Our nickel catalysts are "poisoned" by air in contrast to platinum catalysts. For instance, the activity of our nickel on kieselguhr catalyst No. 50A is practically completely lost by steaming in air for seven hours, and then drying in an oven at 120° for half an hour. The half-time observed for such a catalyst was over 1000 hours, at 50 atmospheres and 25° C., whereas originally the same catalyst showed a half-time of 5 minutes. Evidently complete oxidation of the free metallic nickel to the inactive nickel oxide has taken place. This experiment gives ample warning to the undesirable effect of air and shows that admittance of air has to be avoided during the operation of our nickel catalysts. On the other hand the activity of such a fouled catalyst may be restored by appropriate treatment with hydrogen.

*Preparation of catalysts*

1. PREPARATION OF PLATINUM AND OTHER NOBLE METAL CATALYSTS

The noble metal catalysts were mostly prepared by impregnation of various supports with a chloride or nitrate solution of the platinum metal and its conversion into the metallic state by various reducing agents. As such, sodium formate and hydrazine hydrochloride, particularly recommend themselves. We will now describe the preparation of two platinum catalysts in greater detail which will illustrate the general procedures used.

(a) Preparation of catalyst No. 46; 1.0 gram of platinum per 100 ccs. of charcoal.

Charcoal supplied by the Universal Oil Products Company of Chicago, Illinois, was sieved to 14 to 30 mesh. 1000 ccs. were impregnated with 700 ccs. of a solution containing 51 ccs. of 1.0 molar chloroplatinic acid ($H_2PtCl_6$) equivalent to 10.0 grams platinum and 102 ccs. of 2.0 molar sodium formate.

The impregnation was performed at room temperature. After a while the mixture warms up and this warming is coupled with the reduction of the chloroplatinic acid to platinum and the evolution of gas ($CO_2$). The gas evolution continues steadily for a few hours and then subsides. The catalyst is allowed to stand overnight and is then washed with about 10 liters of distilled water. The excess water is then sucked off and the catalyst is dried in clean air. It is then kept in stoppered containers and is ready for use.

(b) Preparation of catalyst No. 45; 1.0 gram of platinum per 100 ccs. of activated alumina.

200 cc. of 14–30 mesh activated alumina (grade A of the Aluminum Company of America, East St. Louis, Missouri, plant) were impregnated with a mixture of 10.2 cc. of 1.0 mol $H_2PtCl_6$ (prepared by dissolving the hexahydrate obtained from Baker and Co., Newark, New Jersey) and 20.4 cc. of 2.0 mol sodium formate (analytical grade), diluted to 140 cc. This mixture warms up appreciably. The amount of solution specified is just sufficient to cover the granules of alumina. The mixture is allowed to stand in a beaker or cylinder at room temperature (25°±2°). After a few hours, specks of black platinum begin to form in a few places and grow in a spider-like fashion. On standing overnight, all of the platinum is reduced and a colorless solution remains. This is decanted off and the catalyst washed in a percolator free from any solute by using about 1 liter of cold distilled water. The catalyst is then spread on filter paper until all the excess water is sucked up and allowed to dry in clean air, free from dust and hydrogen sulphide for one or two days. It is then kept in a stoppered glass bottle and is ready for use.

The reduction probably proceeds according to the equation:

$$H_2PtCl_6 - 2H.COONa \rightarrow Pt\downarrow - 2NaCl\uparrow - 2CO_2 - 4HCl$$

Actually we use double the theoretical amount of sodium formate to insure complete reduction.

N. B. The reduction of platinum goes much faster if the mixture is kept on a boiling water bath and other catalyst preparations may be prepared in such a way.

2. PREPARATION OF NICKEL CATALYSTS

Preparation of 85 mol percent Ni and 15 mol percent $Cr_2O_3$ catalyst.

Generally the nickel on chromium oxide catalysts are prepared by coprecipitating the requisite amounts of mixed nickel and chromium nitrate from solution by mixture with sodium carbonate (and in some cases ammonium carbonate) solution, usually at room temperature.

For the preparation of the above catalyst 10.07 liters of a .20 molar nickel nitrate solution and 1.35 liters of a .20 molar chromium nitrate solution are mixed together and about 10 liters of a .25 molar solution of sodium carbonate are slowly added under continuous mixing at room temperature. After all of the precipitant has been added the suspension of nickel carbonate and chromium hydroxide is stirred for an additional half hour and then filtered through a Büchner funnel. The catalyst is then thoroughly washed by breaking up the filter cake in a small amount of distilled water and adding an additional amount of approximately 10 liters of water and stirring up the whole mass in the precipitating vessel for about one-quarter to one-half hour. The precipitate is then allowed to settle and the water again sucked off on the Büchner funnel. The washing cycle is repeated until the catalyst has been washed two to three times with two or three separate 10 liter batches of distilled water.

The catalyst is then dried for twenty-four hours at 105 to 120° C. The dried catalyst is first calcined to 350 to 400° C. to decompose the nickel carbonate and to transform it into nickel oxide. If desirable the catalyst can then be pilled. The catalyst is reduced before use by passing hydrogen over it, first at about 250° C. and then finally for about three to four hours at 350 to 375° C.

The catalyst may be stabilized against spontaneous oxidation by air by passing either nitrogen containing small amounts of oxygen over it until its property of spontaneous oxidation has disappeared or by impregnating it with water and allowing slow oxidation to take place while the water evaporates. After the catalyst has been stabilized it is ready for use. In many cases it is advisable to refresh the catalyst in the apparatus in which it is to be used by passing hydrogen over it at a temperature of about 100° C. for a few hours or a day.

The catalyst preparation described here in detail is only one of a very large number of ways of preparing our catalysts, and this example should not be construed as unduly limiting our methods of preparation.

3. PREPARATION OF MOLYBDENUM AND TUNGSTEN SULPHIDE CATALYSTS

Generally molybdenum and tungsten trisulphides ($MoS_3$ and $WS_3$) are precipitated from aqueous solutions of ammonium thiomolybdate ($Am_2MoS_4$) and ammonium thiotungstate ($Am_2WS_4$) by the addition of acids, for instance, dilute sulphuric or hydrochloric, washing the precipitates of the trisulphides, air-drying them at room temperature and then heating them in a stream of hydrogen to a temperature of 100 to 200° C. The composition of the final catalysts lies between the formulas $MoS_2$ to $MoS_3$ and $WS_2$ to $WS_3$ respectively.

All of the above catalysts may be used in the form of granules or preferably be pilled in pilling machines to suitable size pills.

Operability and method of catalyst testing

Figure 16:
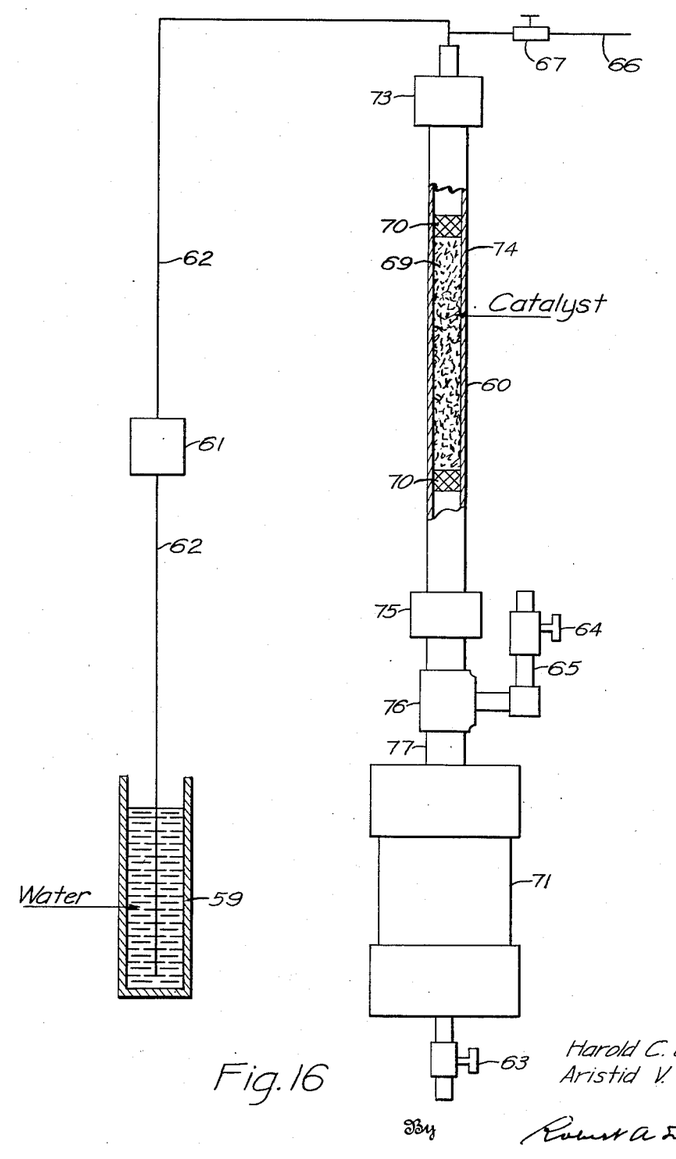
Figs. 16 and 17 are diagrams illustrating two experimental units adapted to employ the process of this invention.
Figure 17:
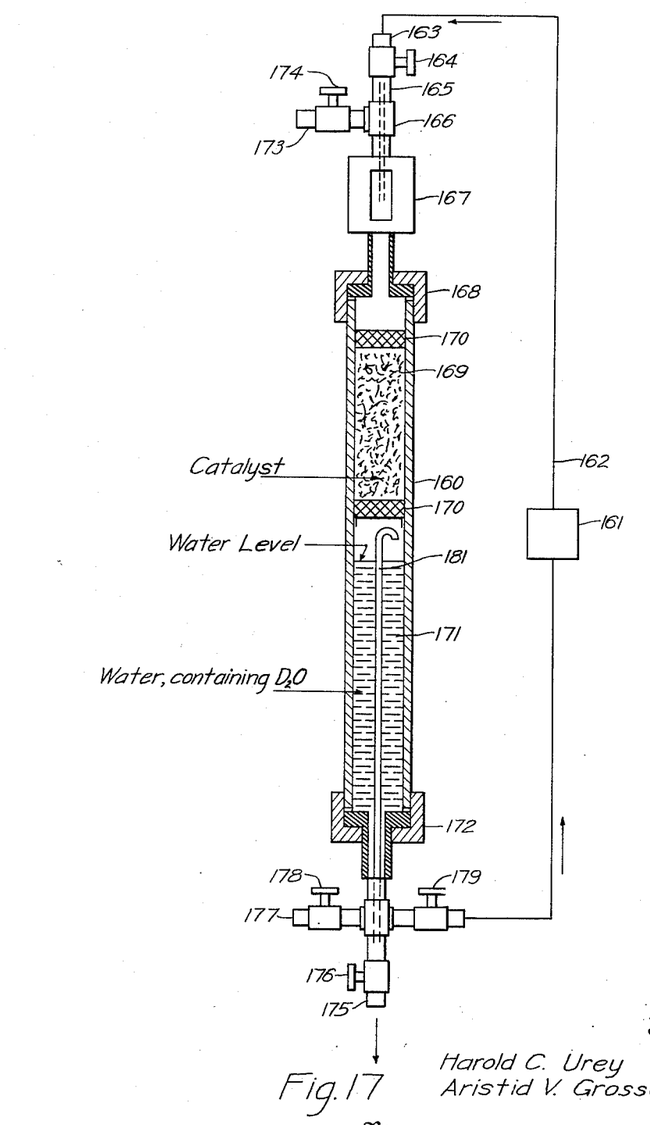

The operability of our invention using liquid water was demonstrated, among others, by two experimental units illustrated in Figs. 16 and 17. These units are suitable for pressure exchanges between hydrogen and water up to 100 atmospheres and over a temperature range from 0 to about 100° C.

In Fig. 16 a copper pressure column 60 is shown which is particularly useful for platinum catalysts, whereas Fig. 17 demonstrates a similar column 160 made of steel, which is adequate for our nickel catalysts.

Referring now to Figure 16, water from container 59 is pumped by means of line 62 and high pressure pump 61 into the top of copper tubular column 60 provided with flared fittings 73 and 75 together with hydrogen gas introduced into the system through line 66 controlled by valve 67. The hydrogen-water mixture maintained at the desired reaction temperature passes by gravity flow through the catalyst 69 retained in place by means of cotton plugs or wicks 70, through fittings 76 and 77 and into the water reservoir 71. The product is withdrawn from the system through valve 63. Valve 64 and pipe 65 serve as means for introducing hydrogen gas or withdrawing hydrogen gas previously introduced into the system through line 66. When hydrogen gas is introduced through 65, it countercurrently contacts the water in reactor 60 and is withdrawn through line 66.

Figure 17 sets forth a modification of the apparatus described in Figure 16, in which provision is made for the recycling of water through the catalyst zone. Referring to Figure 17, water is introduced into the system through line 177 controlled by valve 178 and by means of line 162 and pump 161 passed through fittings 163 and 166, controlled by needle valve 164 through gauge glass 167 and then into the steel tubular reaction column 160 provided with flared fittings 168 and 172. Hydrogen gas may be introduced into the system through line 173 controlled by valve 174. The reaction column 160 contains in its upper portion a catalyst bed 169 between cotton plugs or wicks 170 and in its lower portion a water reservoir 171 from which water is withdrawn and recycled through line 162 by means of pump 161. Pipe 181 having a hooked end positioned above the level of water reservoir 171 extends into line 175 controlled by valve 176 and serves as an outlet for the hydrogen gas introduced through line 173 in concurrent operations. Alternatively, however, hydrogen gas may be introduced into the sysem through line 175 controlled by valve 176 and withdrawing the hydrogen after its passage through catalyst bed 169 through line 173 controlled by valve 174. Water subjected to the above described catalytic reaction may be withdrawn from the system by closing valve 179 and opening valve 178 so that line 177 serves not only as an inlet to the system for water, but also as an outle for the deuterim-containing water product. Generally, the water is kept at the indicated level and continuously recycled by means of pump 161 and line 162.

The performance of the catalyst can be readily checked by periodically taking samples of water and gas and analyzing by the methods referred to previously.

Data obtained on such units have been used in plotting Fig. 10.

In order to demonstrate the operability and evaluate the catalyst for the vapor phase operation under continuous flow conditions, as outlined in scheme 3(b) a relatively simple apparatus may be employed. It consists of a saturator wherein hydrogen is saturated with water vapor at any desired temperature followed by a catalyst section maintained at a slightly higher temperature and through which the hydrogen-water vapor mixture is passed. The slight increase in temperature is to prevent the condensation of water vapor on the catalyst since such condensation causes a great decrease in activity due to the fact that diffusion of the hydrogen through the water film is very much slower than the direct diffusion of water vapor to the catalyst. The deuterium content of the mixture of water and hydrogen before and after passing the catalyst can again be readily determined by methods previously described.

The performance of our nickel catalyst illustrated in Fig. 12 was obtained on employing such a unit.

For the preliminary evaluation of many catalysts it is not necessary to run continuous units and static experiments are sufficient.

In these static experiments we have used either a copper tube or a steel bomb. The copper tube or the bomb is completely filled with catalyst of desired particle size and represents a volume element of the large scale catalytic tower. The catalyst is moistened with a requisite amount of water and then hydrogen pressed into these containers to any desired pressure. After any desired amount of time, usually of the order of 1 to 60 minutes, samples of gas are withdrawn for analysis, the rest of the partly equilibrated hydrogen pumped off and discarded and fresh hydrogen pressed in.

A typical experimental run is as follows:

It was obtained with 35 ccs. of a nickel or kieselguhr catalyst in a glass-lined bomb; 10.0 ccs. of 10.05 mol percent solution of $D_2O$ was used. The hydrogen gas contained the natural amount of deuterium (i. e., 0.017 mol percent) and was pressed in to 50 atmospheres. The rate of exchange was measured at 25° C. by means of a mass spectrograph. The hydrogen gas was allowed to stand for various lengths of time indicated below and the percent deuterium appearing in the gas determined. The results obtained are as follows:

| Time of standing | Vol. Percent of Deuterium in Hydrogen Gas | |
|---|---|---|
| 0 minutes | 0.01 | |
| 2 minutes | 0.42 | |
| 6 minutes | 0.73 | calculated half-time, 9.5' |
| 12 minutes | 1.09 | |
| 20 minutes | 1.34 | |
| standing overnight | 1.91 | |

On allowing the gas to stand overnight, complete exchange took place and from the values given the half-time of the catalyst can be calculated to equal 9.5 minutes.

Various catalysts were tested by this method. Some of the results shown on previous figures, for instance, Figs. 5 and 6, were obtained by this method.

For the evaluation of catalysts, it is immaterial whether one approaches equilibrium using deuterium rich water and deuterium poor hydrogen, or the reverse, since the rate constants, half-times and H. C. S. V.'s of the forward and backward reaction are identical. This we have proven by reaching equilibrium from both sides.

We claim:

1. The process for the production of deuterium oxide comprising bringing deuterium containing hydrogen and water together in a reaction chamber and catalyzing the equilibrium reaction between them by means of a catalyst comprising a substance selected from the group consisting of nickel, cobalt, iron, ruthenium, rhodium, palladium, osmium, iridium, platinum, molybdenum, tungsten, rhenium, and compounds thereof, said catalyst being supported on a relatively inert base.

2. The process as set forth in claim 1 in which the supporting material is of the group of metal oxides not reducible by hydrogen to the metal state.

3. The process as set forth in claim 1 in which the supporting material is of the group consisting of activated carbons and chars.

4. The process as set forth in claim 1 in which the catalyst is nickel and nickel oxide supported on chromium sesquioxide.

5. The process as set forth in claim 1 in which the catalyst is platinum supported on a base selected from the group consisting of alumina and charcoal.

6. The process as set forth in claim 1 in which the catalyst is selected from the group consisting of molybdenum sulphide and tungsten sulphide.

7. The process as set forth in claim 1 in which the catalyst is in a counter-current exchange container with the hydrogen progressing in one direction and the water in the opposite direction.

8. The process as set forth in claim 1 in which the catalyst is in a concurrent exchange unit in which the mixture of hydrogen and water is passed in the same direction over the catalyst bed with transfer of deuterium from the hydrogen to the water during this passage.

9. The process as set forth in claim 1 in which the catalyst is in a cascade of concurrent units, the cascade consisting of a number of identical concurrent units in which the mixture of hydrogen and water is passed in the same direction over the catalyst bed, the units being connected up in series so that the water entering each unit comes from the exit side of the preceding unit, while the water leaving the unit is fed into the next unit of the series and the hydrogen entering each unit coming from the exit of the succeeding unit, and the hydrogen leaving each unit being fed into the entrance of the preceding unit, the first unit of the series being fed with water to be processed and the hydrogen leaving the first unit being discharged, the water from the last unit of the series being converted to hydrogen by any means and the hydrogen thus created being fed to the last unit, a certain amount of water being withdrawn before said conversion and being the product of the cascade so that the flow of water and hydrogen is counter-current in the cascade as a whole, although concurrent in the individual units.

10. The process as set forth in claim 1 in which the units of the cascade, depending upon the relative proportions of water and hydrogen, are arranged to connect the hydrogen exit to any desired preceding unit with the water continuing to the immediately succeeding one or such other unit as is desired.

11. The process as set forth in claim 1 in which the catalyst is placed in a cascade of units forming a system in which at one (top) end water enters and hydrogen leaves while at the other (bottom) end water leaves and hydrogen enters, the water leaving the bottom end being enriched in deuterium and the hydrogen leaving the top end being stripped of deuterium, the cascade of such systems consisting of a number of such systems graded in size so that the first is bigger than the second and so on, water leaving the first cascade being partially converted to hydrogen, the unconverted water being then fed into the second system, and at the end of the last system all of the remaining water except that which is reserved as the production of the cascade being converted into hydrogen and fed back into the last system, while the hydrogen leaving the top of the last system joins the hydrogen from the converted water of the next to the last system and is fed into the bottom of the next to the last system and so on, so that the flow of water from the first cascade to the last continuously decreases in size while the flow of hydrogen from the last system to the first increases in size as it accumulates hydrogen being produced from water between successive systems, permitting any desired gradation in size of successive systems to be attained.

12. The process as set forth in claim 1 in which the exchange chamber containing the catalyst is at any desired pressure and temperature, 0 to about 1000 atmospheres and 0 to 400° C., and in which the partial pressures of either hydrogen or water may be within said range 0 to about 1000 atmospheres.

13. The process as set forth in claim 1 in which the hydrogen discharge from the exchange chamber is passed on to a synthesizing process, such as ammonia, methanol, etc.

14. The process as set forth in claim 1 in which the reaction chamber and the supply of hydrogen are under a high pressure of at least 50 atmospheres.

References Cited in the file of this patent

UNITED STATES PATENTS

| Number | Name | Date |
|---|---|---|
| 2,156,851 | Hansgirg | May 2, 1939 |

OTHER REFERENCES

Eley: Chem. Ab. 36, 16.
Eley et al.: Chem. Ab. 36, 22.